US012784407B2

(12) United States Patent
Zhang et al.

(10) Patent No.: US 12,784,407 B2
(45) Date of Patent: Nov. 3, 2026

(54) SYSTEM AND METHOD FOR IMAGE PROCESSING USING MIXED INFERENCE PRECISION

(71) Applicant: QUALCOMM Incorporated, San Diego, CA (US)

(72) Inventors: Wenhao Zhang, Beijing (CN); Zhiguo Li, Beijing (CN); Shaochun Lv, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 18/833,782

(22) PCT Filed: Mar. 31, 2023

(86) PCT No.: PCT/CN2023/085447
§ 371 (c)(1),
(2) Date: Jul. 26, 2024

(87) PCT Pub. No.: WO2023/186086
PCT Pub. Date: Oct. 5, 2023

(65) Prior Publication Data
US 2024/0386704 A1 Nov. 21, 2024

(30) Foreign Application Priority Data
Mar. 31, 2022 (WO) ................ PCT/CN2022/084453

(51) Int. Cl.
*G06V 10/00* (2022.01)
*G06T 3/40* (2006.01)
(Continued)

(52) U.S. Cl.
CPC ................ *G06V 10/77* (2022.01); *G06T 3/40* (2013.01); *G06V 10/22* (2022.01); *G06V 10/26* (2022.01); *G06V 10/764* (2022.01); *G06V 10/82* (2022.01)

(58) Field of Classification Search
CPC ........ G06V 10/77; G06V 10/22; G06V 10/26; G06V 10/764; G06V 10/82; G06V 10/25;
(Continued)

(56) References Cited

U.S. PATENT DOCUMENTS 10,176,202 B1 1/2019 Newman
2007/0076971 A1* 4/2007 Roimela .............. H04N 19/176
375/E7.176
(Continued)

FOREIGN PATENT DOCUMENTS

CN 109564575 A 4/2019
CN 111160527 A 5/2020
(Continued)

OTHER PUBLICATIONS

Z. Song et al., "DRQ: Dynamic Region-based Quantization for Deep Neural Network Acceleration," 2020 ACM/IEEE 47th Annual International Symposium on Computer Architecture (ISCA), Valencia, Spain, 2020, pp. 1010-1021, doi: 10.1109/ISCA45697.2020.00086. (Year: 2020).*

(Continued)

*Primary Examiner* — Van D Huynh
(74) *Attorney, Agent, or Firm* — Polsinelli

(57) ABSTRACT

Systems and techniques are provided for processing image data. For example, a process can include generating one or more object detection outputs based on an input image. A plurality of image patches can be determined for the input image. Based on the object detection outputs, a first subset of the image patches can be determined as associated with
(Continued)

a first inference precision level and a second subset of the image patches can be determined as associated with a second inference precision level different from the first inference precision level. A processed image patch can be generated for each image patch of the first subset using an image processing machine learning model quantized to the first inference precision level. A processed image patch can be generated for each image patch of the second subset using an image processing machine learning model quantized to the second inference precision level.

30 Claims, 7 Drawing Sheets

(51) Int. Cl.

| | |
|---|---|
| ***G06V 10/22*** | (2022.01) |
| ***G06V 10/26*** | (2022.01) |
| ***G06V 10/764*** | (2022.01) |
| ***G06V 10/77*** | (2022.01) |
| ***G06V 10/82*** | (2022.01) |

(58) Field of Classification Search

CPC ...... G06V 10/30; G06V 10/454; G06V 20/70; G06T 3/40; G06N 3/063; G06N 3/0464; G06N 3/048; G06N 3/0495

See application file for complete search history.

(56) References Cited

U.S. PATENT DOCUMENTS

2008/0310755 A1* 12/2008 Jojic .................... G06V 10/772 382/278
2014/0368549 A1* 12/2014 Lin ....................... G06T 3/4076 345/660
2015/0110340 A1* 4/2015 Harron .................. G06F 16/783 382/100
2016/0292589 A1* 10/2016 Taylor, Jr. ........... G06F 16/1744
2019/0347761 A1* 11/2019 Han ..................... G06V 40/165
2020/0302214 A1 9/2020 Arani et al.
2020/0356805 A1 11/2020 Sun et al.
2020/0364552 A1* 11/2020 Guo ......................... G06N 3/09
2021/0089906 A1 3/2021 Lazovich
2021/0142086 A1 5/2021 Berkovich et al.
2021/0312269 A1 10/2021 Kim et al.
2022/0044114 A1* 2/2022 Sriram ..................... G06N 3/08
2022/0189005 A1* 6/2022 Ge ......................... G06F 18/214
2022/0279183 A1* 9/2022 Besenbruch ........... G06N 3/084
2023/0215156 A1* 7/2023 Sikka ................... G06N 3/0464 382/156
2024/0257511 A1* 8/2024 Sivaraj ................... G06V 10/82

FOREIGN PATENT DOCUMENTS

CN 111147862 B * 2/2021 ............. G06N 3/045
EP 3543917 A1 9/2019
WO 2021178704 A1 9/2021
WO 2021178981 A1 9/2021
WO 2021246913 A1 12/2021

OTHER PUBLICATIONS

International Search Report and Written Opinion—PCT/CN2022/084453—ISA/EPO—Nov. 25, 2022.
International Search Report and Written Opinion—PCT/CN2023/085447—ISA/EPO—Jul. 3, 2023.
Su H., et al., "Spatially Adaptive Block-Based Super-Resolution", IEEE Transactions on Image Processing, vol. 21, No. 3, Mar. 31, 2012, pp. 1031-1045.
Chen L-C., et al., "Deeplab: Semantic Image Segmentation with Deep Convolutional Nets, Atrous Convolution, and Fully Connected CRFs", IEEE Transactions on Pattern Analysis and Machine Intelligence, vol. 40, No. 4, Apr. 26, 2017, pp. 834-848, XP055699398, abstract, p. 837, right-hand column, last paragraph, figure 3.
Supplementary European Search Report—EP23778450—Search Authority—The Hague—Oct. 21, 2025.

* cited by examiner

SYSTEM AND METHOD FOR IMAGE PROCESSING USING MIXED INFERENCE PRECISION

CROSS-REFERENCE TO RELATED APPLICATIONS

This application for Patent is a 371 of international Patent Application PCT/CN2023/085447, filed Mar. 31, 2023, which claims priority to international Patent Application PCT/CN2022/084453, filed Mar. 31, 2022, all of which are hereby incorporated by referenced in their entirety and for all purposes.

FIELD

The present disclosure generally relates to image processing. For example, aspects of the present disclosure are related to systems and techniques for performing image processing using one or more machine learning systems with mixed precision weights and/or activations.

BACKGROUND

Many devices and systems allow image and/or video data to be processed and output for consumption. For example, a camera or a computing device including a camera (e.g., a mobile device such as a mobile telephone or smartphone including one or more cameras) can capture a video or image of a scene, a person, an object, etc. The image or video data can be captured and processed by such devices and systems (e.g., mobile devices, IP cameras, etc.) and stored or output for consumption. For example, the image or video data can be processed and displayed on the device and/or another device. In some cases, the image or video (e.g., a sequence of images or frames) data can be processed for performing one or more functions, can be output for display, can be output for processing and/or consumption by other devices, among other uses.

In some cases, the image or video data can be captured and further processed for effects, such as compression or frame rate up-conversion, and/or certain applications such as computer vision, extended reality (e.g., augmented reality, virtual reality, and the like), image recognition (e.g., face recognition, object recognition, scene recognition, etc.), and autonomous driving, among others. The operations implemented to process image and video data can be computationally intensive. In many cases, the processing of image and/or video data can involve redundant and/or repetitive operations and outputs and can place a significant burden on the hardware resources of a device.

SUMMARY

In some examples, systems and techniques are described for performing image processing (e.g., of stand-alone images or video frames) using one or more machine learning architectures with mixed precision. In some examples, the systems and techniques can be used to perform inference using an image quality machine learning model and/or an image segmentation machine learning model. According to at least one illustrative example, the systems and techniques can utilize mixed numeric precision activations and/or weights to perform inference using an image quality machine learning model.

According to at least one example, an apparatus for processing image data (e.g., of stand-alone images or video frames) is provided that includes a memory (e.g., configured to store data, such as audio data, etc.) and one or more processors (e.g., implemented in circuitry) coupled to the memory. The one or more processors are configured to and can: generate one or more object detection outputs based on an input image; determine a plurality of image patches of the input image, wherein each image patch of the plurality of image patches includes a subset of pixels included in the input image; determine a first subset of the plurality of image patches is associated with a first inference precision level based on the one or more object detection outputs; determine a second subset of the plurality of image patches is associated with a second inference precision level based on the one or more object detection outputs, wherein the second inference precision level is different from the first inference precision level; generate a processed image patch for each image patch of the first subset using at least one image processing machine learning model quantized to the first inference precision level; and generate a processed image patch for each image patch of the second subset using at least one image processing machine learning model quantized to the second inference precision level.

In another example, a method is provided for processing image data (e.g., of stand-alone images or video frames), the method including: generating one or more object detection outputs based on an input image; determining a plurality of image patches of the input image, wherein each image patch of the plurality of image patches includes a subset of pixels included in the input image; determining a first subset of the plurality of image patches is associated with a first inference precision level based on the one or more object detection outputs; determining a second subset of the plurality of image patches is associated with a second inference precision level based on the one or more object detection outputs, wherein the second inference precision level is different from the first inference precision level; generating a processed image patch for each image patch of the first subset using at least one image processing machine learning model quantized to the first inference precision level; and generating a processed image patch for each image patch of the second subset using at least one image processing machine learning model quantized to the second inference precision level.

In another example, a non-transitory computer-readable medium is provided that has stored thereon instructions that, when executed by one or more processors, cause the one or more processors to: generate one or more object detection outputs based on an input image; determine a plurality of image patches of the input image, wherein each image patch of the plurality of image patches includes a subset of pixels included in the input image; determine a first subset of the plurality of image patches is associated with a first inference precision level based on the one or more object detection outputs; determine a second subset of the plurality of image patches is associated with a second inference precision level based on the one or more object detection outputs, wherein the second inference precision level is different from the first inference precision level; generate a processed image patch for each image patch of the first subset using at least one image processing machine learning model quantized to the first inference precision level; and generate a processed image patch for each image patch of the second subset using at least one image processing machine learning model quantized to the second inference precision level.

In another example, an apparatus for processing one or more data samples is provided. The apparatus includes: means for generating one or more object detection outputs based on an input image; means for determining a plurality of image patches of the input image, wherein each image patch of the plurality of image patches includes a subset of pixels included in the input image; means for determining a first subset of the plurality of image patches is associated with a first inference precision level based on the one or more object detection outputs; means for determining a second subset of the plurality of image patches is associated with a second inference precision level based on the one or more object detection outputs, wherein the second inference precision level is different from the first inference precision level; means for generating a processed image patch for each image patch of the first subset using at least one image processing machine learning model quantized to the high inference precision level; and means for generating a processed image patch for each image patch of the second subset using at least one image processing machine learning model quantized to the second inference precision level.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
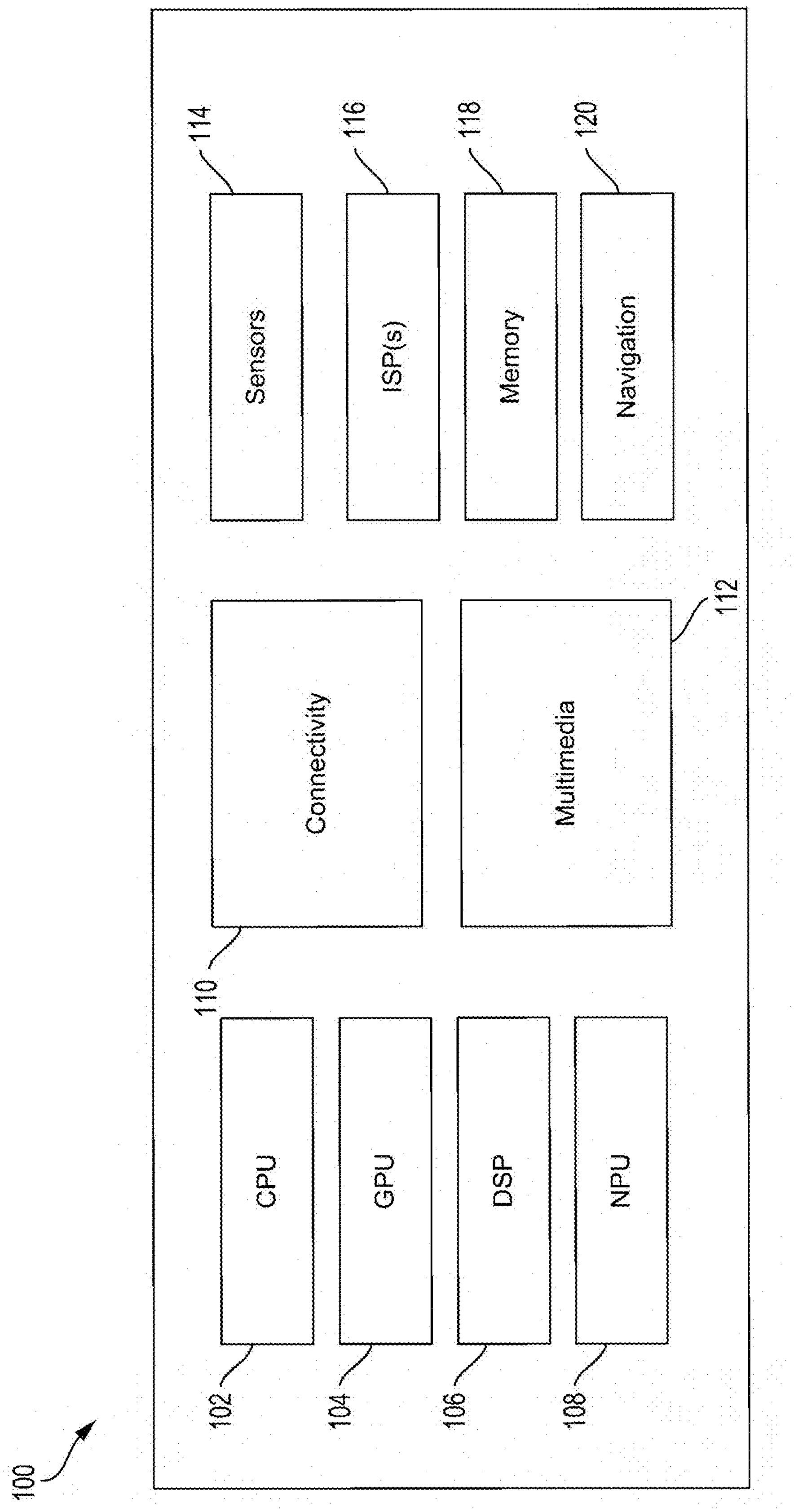
FIG. 1 illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the spirit and scope of the application as set forth in the appended claims.

The demand and consumption of image and video data has significantly increased in consumer and professional settings. As previously noted, devices and systems are commonly equipped with capabilities for capturing and processing image and video data. For example, a camera or a computing device including a camera (e.g., a mobile telephone or smartphone including one or more cameras) can capture a video and/or image of a scene, a person, an object, etc. The image and/or video can be captured and processed and output (and/or stored) for consumption. The image and/or video can be further processed for certain effects, such as compression, frame rate up-conversion, sharpening, color space conversion, image enhancement, high dynamic range (HDR), de-noising, low-light compensation, among others. The image and/or video can also be further processed for certain applications such as computer vision, extended reality (e.g., augmented reality, virtual reality, and the like), image recognition (e.g., face recognition, object recognition, scene recognition, etc.), and autonomous driving, among others. In some examples, the image and/or video can be processed using one or more image or video artificial intelligence (AI) models, which can include, but are not limited to, AI quality enhancement and AI augmentation models. Video processing operations may be the same as or similar to image processing operations, where individual video frames are processed as still images.

Image and video processing operations can be computationally intensive. In some cases, image and video processing operations can become increasingly computationally intensive as the resolution of the input image or frame of video data increases (e.g., as the number of pixels to be processed per input image or frame of video data increases). For example, a frame of video data with a 4K resolution can include approximately four times as many individual pixels as a frame of video data with a full HD (e.g., 1080p) resolution. In some examples, image and video processing operations can be performed by processing each pixel individually. In some examples, image and video processing operations can be performed using one or more machine learning models to derive a mapping from input image data (e.g., raw image data captured by one or more image sensors) to a final output image.

For example, one or more machine learning models can be used to derive a mapping between raw image data that includes a color value for each pixel location and a final output image. The final output image can include processed image data derived from the raw image data (e.g., based on the mapping learned by the one or more machine learning models). In some examples, the one or more machine learning models can include a neural network of convolutional filters (e.g., a convolutional neural network (CNN)) for the image and/or video processing task. For example, an image processing neural network can include an input layer, multiple hidden layers, and an output layer. The input layer can include the raw image data from one or more image sensors. The hidden layers can include convolutional filters that can be applied to the input data, or to the outputs from previous hidden layers to generate feature maps. In some cases, the neural network can have a series of many hidden layers, with early layers determining simple and low-level characteristics of the raw image input data, and later layers building up a hierarchy of more complex and abstract characteristics. The neural network can then generate the final output image (e.g., making up the output layer) based on the determined high-level features.

Machine learning networks that receive as input a first image data (e.g., raw image data) and generate as output a second image data (e.g., a final processed image) can be referred to as image-to-image translation networks, or image2image networks. For example, image2image networks can be used to perform tasks such as image enhancement, upscaling, HDR, denoising, low-light enhancement, etc. As mentioned previously, image or video processing operations performed using a machine learning (e.g., image2image) network can increase in computational complexity as the number of pixels per input image or video frame increases. In some cases, image or video processing operations performed using a machine learning (e.g., image2image) network can increase in computational complexity as the number of hidden layers increases, as the number of nodes or activation functions increases, and/or as the number of connections between nodes or layers increases. For example, a node (e.g., neuron) in a neural network can apply an activation function to a group of weighted inputs, and return an output generated by the activation function. A hidden layer can include one or more nodes. An increase in the number of hidden layers or nodes can cause an increase in the computational complexity of an image processing machine learning (e.g., image2image) network, based on a greater number of mathematical operations being performed for each image that is processed.

An increase in the number of hidden layers or nodes can also cause an increase in the size of an image processing machine learning (e.g., image2image) network. For example, the activation functions and weights associated with a neural network can each be associated with one or more numerical values (e.g., a numerical weight value, a numerical activation value representing an input or output of an activation function, a numerical value included in a lookup table used to implement a quantized activation function, etc.) used to apply the activation function or weight). Activation functions can be implemented as rectified linear activation functions (ReLUs), sigmoid activation functions, hyperbolic tangent activation functions (tanh), among various others. One or more numerical values can be used to define a respective activation function. As the number of hidden layers or nodes of a machine learning network increases, the number (e.g., quantity) of numerical values that are stored and applied in association with the machine learning network also increases.

In some cases, the size and complexity of a machine learning network can also increase with the precision used to store each representation of the numerical values associated with the activations and/or weights of the machine learning network. For example, a machine learning network that uses a 32-bit floating-point (FP32) number format to represent activations and/or weights may be associated with a greater precision or accuracy than an otherwise identical machine learning network that uses a 16-bit floating-point (FP16) number format to represent the same respective activations and/or weights. The use of FP32 activations and weights can also be associated with an increased size and computational complexity of the associated machine learning network, relative to the use of FP16 representations.

In some cases, a machine learning network can use fixed-point (e.g., rather than floating-point) representations of the numerical values associated with the activations and/or weights of the machine learning network. For example, a 32-bit fixed-point (INT32), 16-bit fixed-point (INT16), 8-bit fixed-point (INT8), and/or a 4-bit fixed-point (INT4) number format can be used to represent activations and weights. The use of INT16 activations and weights can be associated with a decreased size or computational complexity than the use of FP16 activations and weights but may also be associated with a decreased precision or accuracy relative to the use of FP16. In some examples, a similar tradeoff between precision and model size/computational complexity can be seen in the use of INT16 relative to INT8 or INT4, in the use of INT8 relative to INT4, etc.

As mentioned previously, the operations implemented to perform image and/or video processing operations can be computationally intensive and can place a significant burden on the hardware resources of a device. Image and/or video processing operations can include quality improvement operations, such as HDR, denoising, low-light enhancement, etc., among various others. In some examples, one or more image processing machine learning models (e.g., image2image) can be implemented by a smartphone, mobile computing device, or other edge computing device that includes or is otherwise associated with a camera or other image capture device. In some cases, smartphones or other edge computing devices implementing image processing machine learning models can be limited by a combination of the device's available computation resources and the device's power supply and/or consumption limits. Smartphones or other edge computing devices implementing image processing machine learning models may additionally, or alternatively, be limited based on a maximum permissible inference time (e.g., the amount of time for the machine learning model to generate a processed image output based on a given input of raw image data). For example, to perform real-time augmentation or enhancement operations on video data (e.g., upscaling, style transfer, colorizing, HDR, denoising, low-light enhancement, etc.), in some cases an image processing machine learning model may have a latency target of approximately 20 milliseconds (ms) or less per frame of video data.

In some examples, smartphones and other edge computing devices associated with limited computational resources and power can implement image processing machine learning models (e.g., image2image) by using a model with a reduced size. For example, the size of an image processing machine learning model can be reduced by decreasing the total number of hidden layers, nodes, activation functions, weights, etc., that are applied by the machine learning model in generating a processed output image based on a raw image data input. In some cases, a reduction in model size can impact the accuracy of the processed output image that is generated by the image processing machine learning model.

In some examples, the size and/or computational complexity of an image processing (e.g., image2image) machine learning model can be reduced by a quantization process that converts numerical values (e.g., used to represent activation functions, activations, and/or weights associated with the model) from a higher precision number format to a lower precision number format. For example, an image processing machine learning model can be trained using FP32 values and quantization can be performed to convert the trained FP32 values to a lower-precision number format (e.g., FP16, INT32, INT16, INT8, INT4) prior to or during inference. In some cases, quantization and/or a reduction in the numerical precision associated with the activations and/or weights of an image processing machine learning model can also impact the accuracy of the processed output image that is generated by the image processing machine learning model. For example, a model trained using FP32 values may provide accurate results when evaluated against test/validation data and using the trained FP32 values for the activations and weights. The same model may provide lower accuracy results during inference, when using the quantized (e.g., converted from FP32 to a lower precision number format) FP16/INT32/INT16/INT8/INT4 versions of the trained FP32 values for the activations and weights.

Systems and techniques are needed for accelerating image processing (e.g., image2image) machine learning model inference while maintaining or improving model accuracy in performing the image processing task. While some machine learning and neural network-based approaches have investigated quantizing trained models prior to inference, these approaches are often limited by their use of a single, fixed numerical precision for each input image. The models used in these approaches perform quantization on a per-image basis, and the quantization choice may not reflect factors such as the relative importance of different areas of an input image, the object(s) or type of content included in different areas of an input image, and/or the type(s) of image processing or augmentation operation to be performed. In some cases, an image processing machine learning model implemented on a smartphone or other edge computing device associated with limitation computational resources and power may be unable to meet or achieve an inference latency target even when using the overall model size reductions and/or quantization to fixed-point numerical values for inference, as were described above Systems, apparatuses, processes (also referred to as methods), and computer-readable media (collectively referred to as "systems and techniques") are described herein for performing image processing using one or more image processing machine learning networks with mixed precision. For example, an image processing machine learning network can utilize two or more numeric precision levels to perform inference for various ones of a plurality of image patches generated based on an input image. In some aspects, the numeric precision levels can include 32-bit floating-point (FP32), 16-bit floating-point (FP16), 32-bit fixed-point (INT32), 16-bit fixed-point (INT16), 8-bit fixed-point (INT8), and/or 4-bit fixed-point (INT4) number formats.

For example, an input image can be divided into a plurality of image patches and each image patch can be analyzed or otherwise classified with a determined precision level to be used during inference performed using an image processing machine learning network. The image processing machine learning network can be quantized to the determined precision level associated with each of the plurality of image patches. Inference can be performed for each respective image patch of the plurality of image patches, using the corresponding precision level determined for each respective image patch (e.g., a high precision level, a low precision level, etc.) After inference is performed for each image patch, the resulting processed image patches generated using mixed-precision inference can be combined (e.g., re-combined) into a single, processed output image.

In some examples, an inference precision level can be determined for each respective image patch of the plurality of image patches based on one or more semantic segmentation and/or object detection outputs. The one or more semantic segmentation and/or object detection outputs can be generated based on an input image. In some cases, the one or more semantic segmentation and/or object detection outputs can be generated based on a resized version of the input image. For example, the input image can be resized to generate a resized image with smaller dimensions (e.g., in pixels). In some cases, the reduction in dimensions between the input image and the resized image can be based on a granularity of the semantic segmentation and/or object detection. For instance, a coarse segmentation can be performed using a resized (e.g., downscaled) image while maintaining relatively accurate segmentation results. In some examples, the resized image can be generated in parallel to the plurality of image patches generated from the input image. The resized image can be used to generate one or semantic segmentation and/or object detection outputs associating portions (e.g., subsets of pixels) of the resized image with one or more classifications, labels, and/or segmentation masks. The semantic segmentation and/or object detection outputs generated from the resized image can be mapped to the image patches of the full-size input image and used to classify each image patch. In some examples, the semantic segmentation and/or object detection outputs can be used to classify each image patch based on visual importance, as including subject/context information or background information, etc. Image patches determined to include regions of visual importance can be associated with or assigned a relatively high inference precision level (e.g., FP32, FP16, INT32, INT16). Image patches determined to include background regions or determine to lack regions of visual importance can be associated with or assigned a relatively low inference precision level (e.g., INT8, INT4). Inference can be performed for the plurality of image patches by using the determined inference precision level to quantize the numeric values associated with the activation functions and/or weights of the image processing machine learning network. For example, image patches with a relatively high inference precision level can be provided as input to an image processing machine learning network with activations and/or weight values quantized to an FP32, FP16, INT32, or INT16 number format. Image patches with a relatively low inference precision level can be provided as input to the same image processing machine learning network, with activations and/or weight values quantized to an INT8 or INT4 number format.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected. SOC 100 and/or components thereof may be configured to perform image processing using machine learning techniques according to aspects of the present disclosure discussed herein. For example, SOC 100 and/or components thereof may be configured to perform semantic image segmentation and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
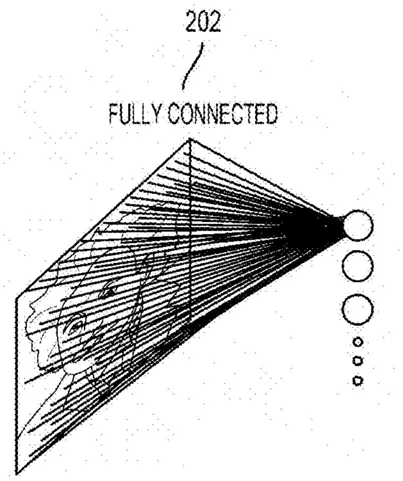
FIG. 2A illustrates an example of a fully connected neural network, in accordance with some examples.
Figure 2B:
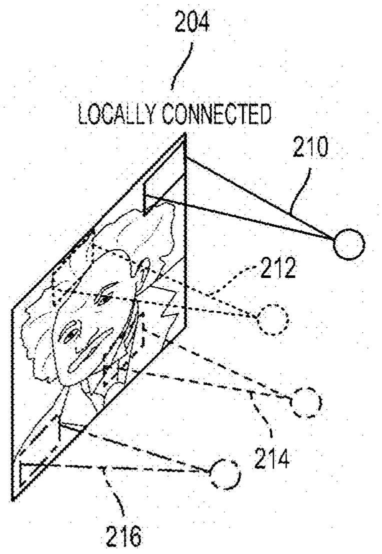
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

Figure 3:
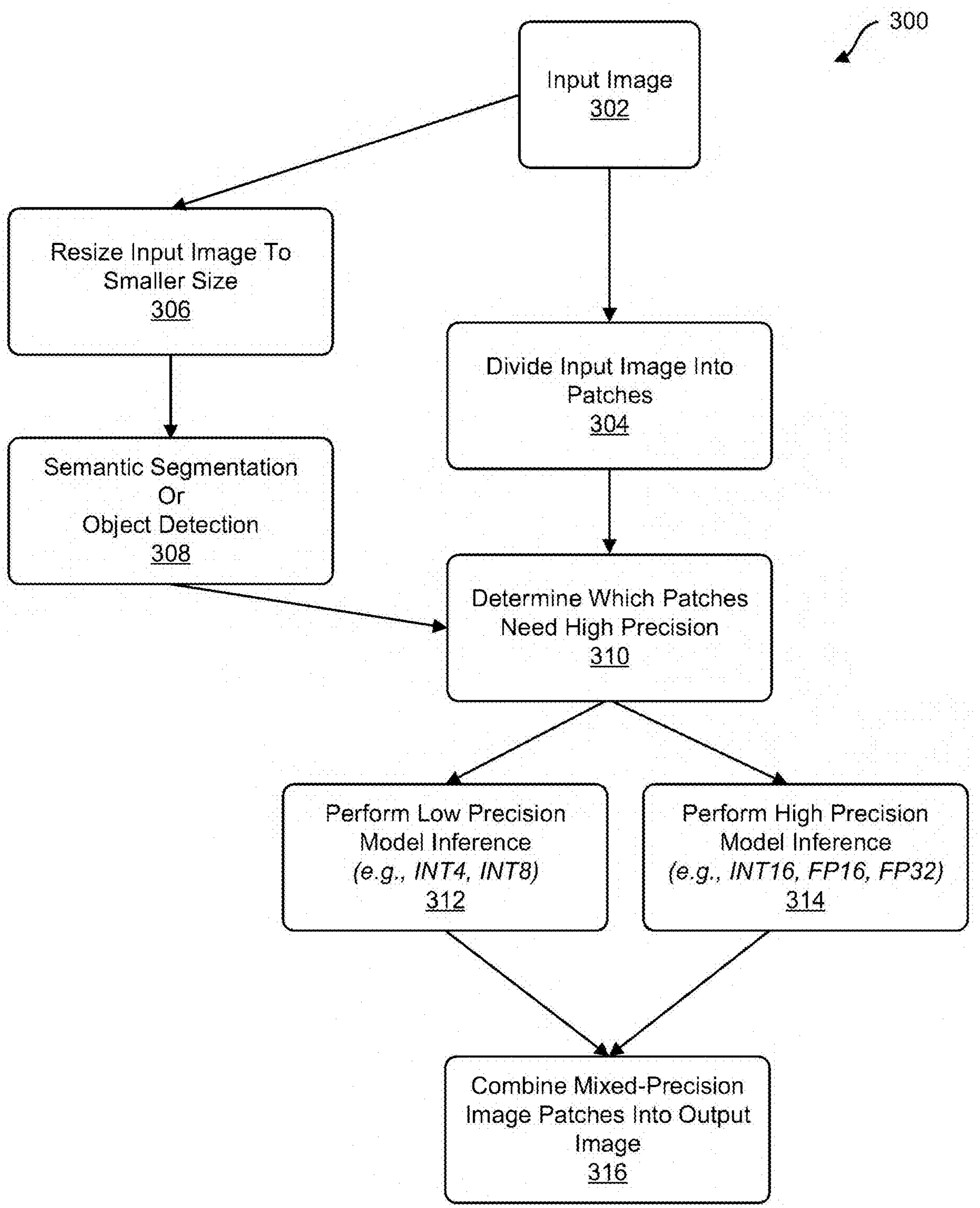
FIG. 3 illustrates an example flow diagram of a process for utilizing mixed precision inference using one or more image processing machine learning models, in accordance with some examples.

FIG. 3 illustrates an example flow diagram of a process 300 for performing image processing using one or more machine learning models with mixed precision. For example, the process 300 can be used to accelerate inference by an image processing (e.g., image2image) machine learning model while maintaining inference quality and/or performance. As will be described in greater depth below; the process 300 can utilize mixed numeric precision representations of activations and/or weights associated with an image processing (e.g., image2image) machine learning model, for example based on one or more semantic segmentation and/or object detection outputs. In one illustrative example, a semantic segmentation or object detection output can be used to determine one or more regions of interest within an input image, wherein the image processing (e.g., image2image) machine learning model uses a higher numeric precision (e.g., FP32, FP16, INT32, INT16, etc.) for regions of interest and a relatively lower numeric precision (e.g., INT8, INT4, etc.) for non-regions of interest.

The process 300 can include receiving or otherwise obtaining an input image at block 302. For example, the input image can be obtained from a camera, or a computing device including or otherwise associated with one or more cameras (e.g., a mobile computing device such as a mobile telephone or a smartphone including one or more cameras). For example, the camera can capture a video or image of a scene, a person, an object, etc. In some cases, the input image can be processed or pre-processed (e.g., by one or more image signal processors (ISPs) associated with the camera or computing device) prior to or concurrent with block 302. The input image can be a still image or a frame of video data. In some cases, the input image can be obtained from a storage or memory associated with a computing device (e.g., a previously captured and/or processed image).

The input image can be associated with an initial, or input, resolution. For example, the input resolution can be associated with a first number of pixels along a first dimension (e.g., width, x-axis, etc.) and a second number of pixels along a second dimension (e.g., height, y-axis, etc.). The input resolution can additionally, or alternatively, be associated with a total number of pixels. For example, an input image that is provided as a still image captured by a camera can be associated with a total number of megapixels, where one megapixel represents one million pixels. In some cases, an input image that is provided as a frame of video data can be associated with a horizontal display resolution such as full HD or 1080p (1920×1080), 4K UHD (3840×2160), DCI 4K (4096×2160), 8K UHD (7680×4320), etc. It is noted that the input resolutions listed above are provided for purposes of example and are not intended to be limiting.

The input image can be received or obtained prior to performing inference using an image processing (e.g., image2image) machine learning model, as will be described in greater depth below with respect to the inference associated with blocks 312 and/or 314. In some cases, inference can be performed based on dividing the input image into a plurality of patches of a smaller size (e.g., including fewer pixels than the whole input image), wherein inference can be performed for the patches individually.

At block 304, the process 300 can include dividing the input image into a plurality of image patches (also referred to herein as "patches"). For example, the input image can be divided into a plurality of equally sized patches, wherein each patch includes a subset of the pixels included in the input image. In some cases, the input image can be divided into a plurality of patches having multiple different sizes and/or shapes, wherein each patch includes a subset of the pixels included in the input image. In some cases, the input image can be divided into a plurality of non-overlapping patches (e.g., each patch includes a unique subset of the pixels included in the input image). In some examples, the input image can be divided into a plurality of patches wherein two or more of the patches are overlapping (e.g., the same pixel(s) are contained in two or more patches). The plurality of patches can be generated such that each pixel included in the input image is included in at least one patch, although it is also possible for the plurality of patches to omit one or more pixels of the input image.

Figure 4A:
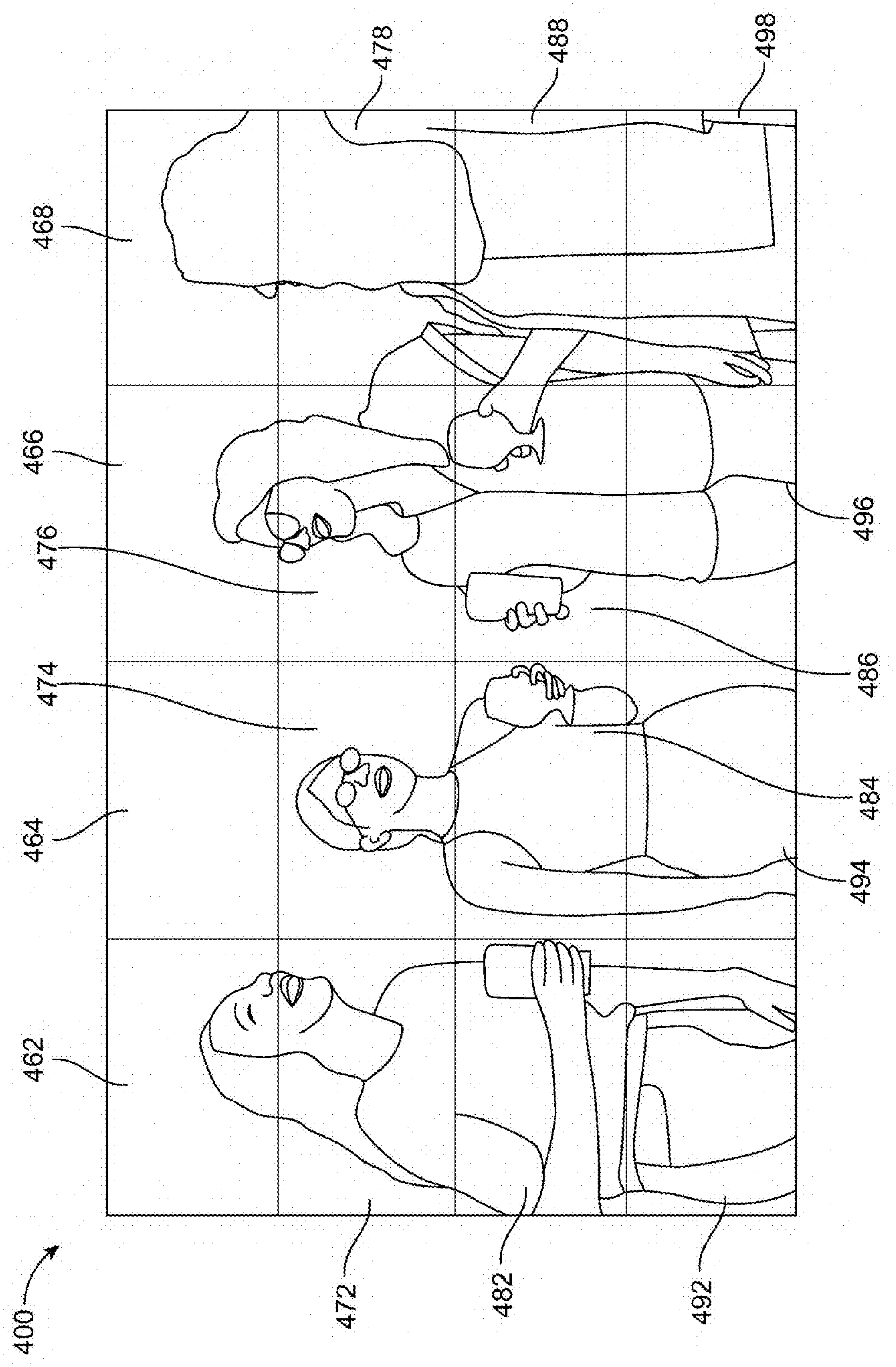
FIG. 4A is a diagram illustrating an example of an input image divided into a plurality of image patches associated with mixed inference precision levels, in accordance with some examples.

In one illustrative example, an input image can be divided into a plurality of patches, as illustrated in FIG. 4A, which depicts an example 400 of an input image divided into 16 equally sized rectangular patches (note that FIG. 4A also depicts a semantic segmentation or object detection output determined for the input image, which will be discussed below with respect to block 308). In some cases, an input image can be divided into a greater or fewer number of patches, for example based at least in part on the input resolution of the input image. For example, the size and/or number of patches used to divide the input image can be determined based at least in part on the memory and/or computational resources available at the computing device where the input image will be processed using an image processing (e.g., image2image) machine learning model. In some examples, the computing device can be a smartphone or other edge device with limited computational resources and/or power. For example, an image processing (e.g., image2image) machine learning model can be implemented using a hardware accelerator such as a digital signal processor (DSP), neural processing unit (NPU), etc., which is unable to perform inference for an input that includes the entirety of the input image.

In some examples, an input image with a 4K (e.g., 3840×2160) resolution (e.g., an input image that is a frame of 4K video) can be divided into 16 patches with each patch having a size of 960×540. In some examples, an input image with a 4K resolution can be divided into 64 patches with each patch having a size of 480×270. In some examples, an input image can be divided equally into 16 patches. In some cases, an input image can be divided equally into 64 patches although it is noted that greater or fewer numbers of patches can be utilized. In one illustrative example, a total number of patches and/or one or more sizes or dimensions of the patches can be pre-determined. In some aspects, the total number of patches and/or the size of each patch generated for an input image can increase with the input resolution of the input image.

In some approaches to performing image processing using an image processing machine learning model, a single inference precision level (e.g., FP32, FP16, INT32, INT16, INT8, INT4, etc.) can be selected after dividing an input image into patches. For example, an INT16 inference precision can be selected, and each image patch can be processed (e.g., inference can be performed) using an image processing machine learning model with INT16 activations and/or weights. In some cases, when the selected inference precision (e.g., INT16) is lower than the precision used in training for the model (e.g., FP32), the model can be quantized prior to inference (e.g., the FP32 activations and weights of the trained model can be quantized to INT16 representations prior to performing inference). In some examples, the selection of inference precision can be performed offline, prior to the inference runtime. Model quantization to the selected level of inference precision can also be performed offline or prior to the inference runtime, such that an input image is divided into a plurality of patches and an already quantized image processing machine learning model can perform inference for each patch. After performing model inference for each image patch, the inference outputs generated for the individual patches can be recombined or otherwise used to generate a single output image for the image processing machine learning model.

In the single inference precision level approach to machine learning-based image processing (e.g., described above), the precision of the image processing machine learning model is fixed and is uniformly applied to each image patch. For example, the image processing machine learning model can be associated with or otherwise perform inference using the same numeric precision level for each patch, wherein the numeric precision level is fixed based on a prior quantization of the trained model.

In the approach described above, the quantized image processing machine learning model may be associated with an inference latency, which is the time spent to perform inference for a single image patch. If the quantized model is associated with an inference latency that does not meet a performance target (e.g., 20 ms or less for processing a 4K video with a frame rate of 30 frames-per-second (fps)), then in some cases the inference latency can be reduced by using a smaller model. As mentioned previously, model size can be reduced by reducing the number of hidden layers, the number of nodes or activation functions, and/or the number of connections or weights, etc. Such a reduction in model size can be associated with a decrease in performance and may require the reduced-size model to be re-trained (e.g., because a model with a decreased number of activation functions or weights may be distinct from the original model).

In some cases, an already quantized image processing machine learning model may be quantized to a lower level of numeric precision (e.g., in order to reduce inference latency or meet a performance target). For example, quantization from an FP32 trained model to an INT16 model for inference was described above—if the INT16 quantized model does not meet a performance target, a smaller model can be implemented by quantizing the FP32 trained model (or the INT16 quantized model) to generate an INT8 or INT4 quantized model. Quantizing a trained image processing machine learning model to a lower level of precision can reduce inference latency and may better meet an inference time performance target but can also reduce the accuracy and/or ability of the lower-precision quantized model to achieve the desired image processing effect. In some cases, quantizing a trained image processing machine learning model to a lower level of precision can prevent the quantized model from meeting or providing the desired image processing effect(s) associated with the model. Additionally, a high level of accuracy can be needed in the processed output images generated by image processing machine learning models, as visual artifacts (e.g., areas of low or decreased accuracy) can be quickly detected by viewers of the processed output images.

In some cases, in the approach described above, an image processing machine learning model may require a lower level of precision in order to meet an inference latency target while simultaneously requiring a higher level of precision in order to meet an image processing accuracy/quality target. For example, in such a scenario, quantizing an image or video processing machine learning model to a lower level of precision can allow the quantized model to achieve real-time performance for processing 30 fps video but with a low accuracy or low-quality visual result. Quantizing an image or video processing machine learning model to a higher level of precision can allow the quantized model to achieve the desired visual accuracy or visual quality but can result in the quantized model being unable to achieve real-time performance for 30 fps video.

In instances in which an image or video processing machine learning model is implemented on a smartphone or other edge device with limited computing resources and/or power, the approach described above can result in scenarios in which none of the available precision levels are able to resolve the inference latency-visual quality tradeoff. In one illustrative example, the systems and techniques described herein can utilize different precision levels for the plurality of patches generated from an input image, based at least in part on performing semantic segmentation, object detection, and/or object classification to identify patches for which higher precision levels can be utilized and/or patches for which lower precision levels can be utilized.

Figure 4B:
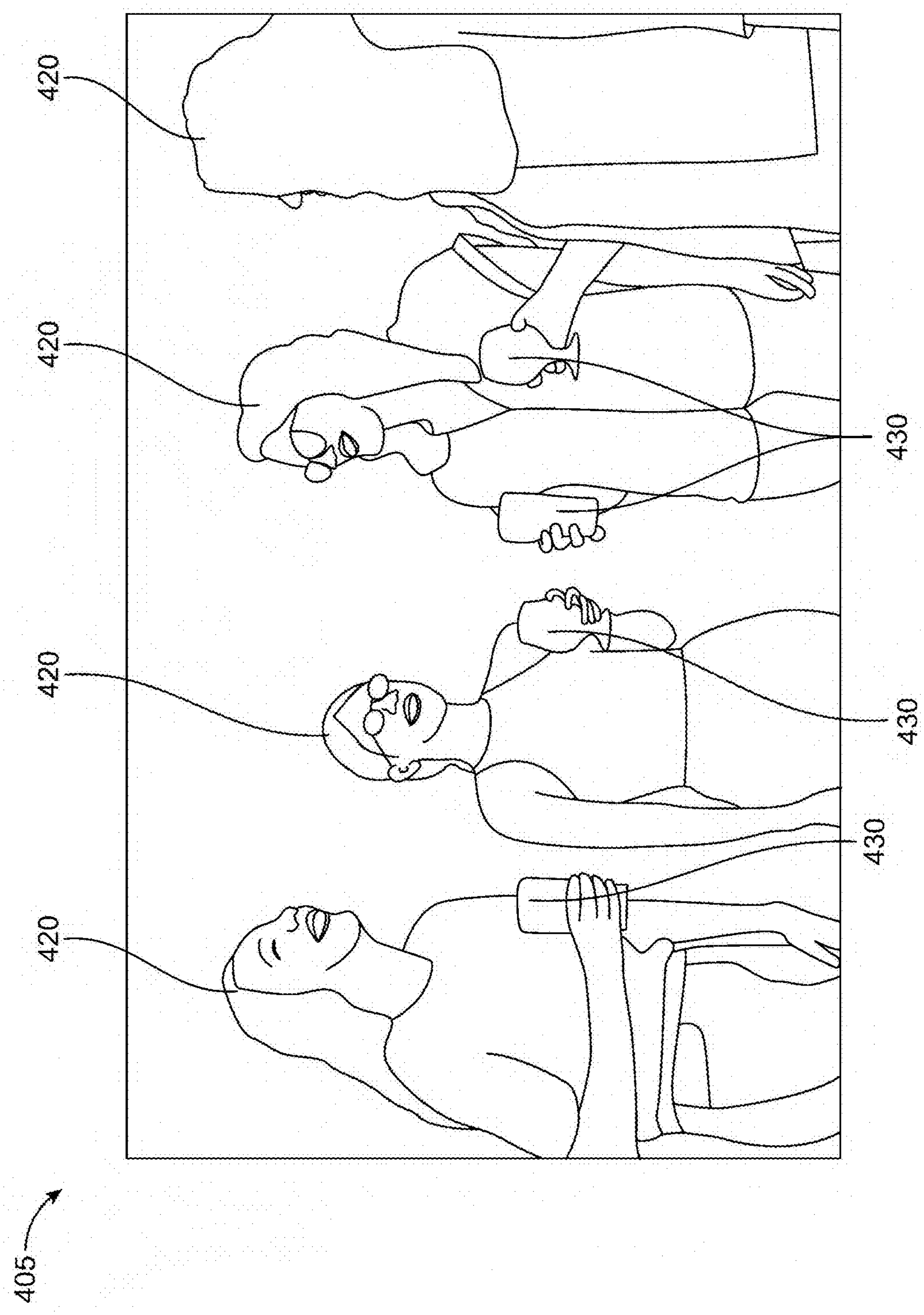
FIG. 4B is a diagram illustrating an example of a resized input image associated with a semantic segmentation or object detection output, in accordance with some examples.

For example, at block 306, the process 300 can include resizing the input image to a smaller size. In some aspects, the input image can be downscaled or otherwise processed to generate a smaller sized version of the input image. For example, an input image can be resized to a smaller size such as 512×512 pixels, 384×384 pixels, etc. The aspect ratio of the input image can be maintained in the downscaled version of the input image or can be changed. In some examples, input images of different input resolutions can each be downscaled to the same size (e.g., block 306 can include resizing the input image to a smaller size independent of the input resolution of the input image). FIG. 4B depicts an example of a resized image 405 that is a downscaled version of the larger input image illustrated in FIG. 4A. In some cases, the input image can be resized using one or more pre-determined dimensions or resolutions associated with the semantic segmentation or object detection of block 308.

At block 308, the process 300 can include performing semantic segmentation, object detection, and/or object classification for the resized (e.g., downscaled) image generated in block 306. In some examples, resizing the input image (e.g., block 306) and performing semantic segmentation and/or object detection (e.g., block 308) can be performed in parallel with dividing the input image into patches (e.g., block 304). For example, blocks 306 and 308 can be performed concurrently with block 304. In some aspects, blocks 306 and/or 308 can be performed separate from block 304 or in series with block 306. Based on one or more semantic segmentation outputs and/or object detection outputs, a precision level can be determined for each one of the image patches, in block 310 (e.g., as will be described in greater depth below). For example, as will be described in greater depth below, the semantic segmentation and/or object detection output(s) can be used to determine a relatively high level of precision (e.g., INT16, INT32, FP16, FP32) for image patches associated with or including visual areas of interest. The semantic segmentation and/or object detection output(s) can additionally, or alternatively, be used to determine a relatively low level of precision (e.g., INT8, INT4) for image patches determined to include background or otherwise determined to not include visual areas of interest (e.g., as will also be described in greater depth below with respect to block 310). In some cases, the semantic segmentation and/or object detection output(s) can be indicative of a first subset of image patches that correspond to foreground objects, non-background classes, etc. The first subset of image patches can be associated with a relatively high inference precision level. The semantic segmentation and/or object detection output(s) can additionally be indicative of a second subset of image patches that correspond to non-foreground objects, background classes, etc. The second subset of image patches can be associated with a relatively low inference precision level. The first and second subsets of image patches can be distinct and non-overlapping. The relatively low inference precision level can be lower than the relatively high inference precision level.

With respect to block 308, semantic segmentation or object detection can be performed for the resized version of the input image obtained in block 306. In some examples, semantic segmentation or object detection can be performed for the entire resized image and the semantic segmentation or object detection output(s) subsequently mapped to one or more of the image patches generated for the original (e.g., full-size) input image.

Semantic segmentation can be performed by segmenting the resized (e.g., downscaled) version of the input image into multiple portions. For example, the resized image can be segmented into foreground and background portions, with a relatively high level of precision used to perform inference for image patches subsequently determined in block 310 to include or be associated with foreground portions and a relatively low level of precision used to perform inference for image patches subsequently determined in block 310 to include or be associated with background portions. In some examples, segmentation results can include one or more segmentation masks generated to indicate one or more locations, areas, and/or pixels within the resized image that belong to a given semantic segment (e.g., a particular object, class of objects, etc.). For example, each pixel of a generated segmentation mask can include a value indicating a particular semantic segment (e.g., a particular object, class of objects, etc.) to which each pixel belongs. In some examples, features can be extracted from the resized image and used to generate one or more segmentation masks for the resized image based on the extracted features. In some cases, machine learning can be used to generate segmentation masks based on the extracted features. For example, a convolutional neural network (CNN) can be trained to perform semantic image segmentation by inputting into the CNN many training images and providing a known output (or label) for each training image. In some cases, visual transformers may be utilized to perform semantic image segmentation, among various other machine learning and/or neural network architectures. The known output for each training image can include a ground-truth segmentation mask corresponding to a given training image.

In some cases, image segmentation can be performed to segment the resized image 405 into segmentation masks based on an object classification scheme (e.g., the pixels of a given semantic segment all belong to the same classification or class). For example, one or more pixels of the resized image 405 can be segmented into classifications such as human, hair, skin, clothes, house, bicycle, bird, background, etc. As illustrated in FIG. 4B, the resized image 405 can be segmented to include a human classification 420 (e.g., shown here as being associated with four different instances or segmentation masks corresponding to human classification 420) and a drink classification 430 (e.g., shown here as being associated with four different instances or segmentation masks corresponding to drink classification 430).

In some examples, a segmentation mask can include a first value for pixels that belong to a first classification, a second value for pixels that belong to a second classification, etc. A segmentation mask can also include one or more classifications for a given pixel. For example, the classification 420 can have sub-classifications such as ‘hair,’ ‘face,’ or ‘skin,’ such that a group of pixels can be included in a first semantic segment with a ‘face’ classification and can also be included in a second semantic segment with a ‘human’ classification.

In some aspects, a level of granularity associated with or provided by the segmentation mask(s) generated for resized image 405 can be determined based at least in part on factors that can include, but are not limited to, the size or resolution (e.g., number of pixels) associated with resized image 405, a segmentation time target (e.g., greater segmentation granularity may be associated with a longer segmentation time), etc. In some examples, different semantic classifications can be associated with a relatively high inference precision level and a relatively low inference precision level. For instance, in one example, only image patches associated with a 'face' classification may be assigned a relatively high inference precision level, while remaining classifications (e.g., including other human-related classifications such as 'body,' 'clothing,' etc.) may be assigned to the relatively low inference precision level. In another example, image patches associated with a 'face' classification or a 'body' classification may both be assigned a relatively high inference precision level (e.g., in cases where the image processing operation focuses on the whole portrait of individuals depicted in the input image).

In some examples, one or more machine learning models (e.g., neural networks) can be used to perform semantic segmentation in block 308. For example, a neural network (e.g., CNN) can be trained to perform semantic segmentation for image inputs of a same or similar size as the resized image generated in block 306. In some cases, the resized image generated in block 306 can downscale the input image (e.g., of block 302) to a constant or pre-determined size such that the same semantic segmentation neural network can be utilized at block 308 for various different input image sizes and/or input resolutions.

In some aspects, the semantic segmentation and/or object detection of block 308 can be performed using one or more machine learning models (e.g., neural networks) that are separate from the image processing (e.g., image2image) machine learning model used to perform inference in blocks 312 and 314. In some examples, the semantic segmentation and/or object detection of block 308 can be performed by the same machine learning model that is used to perform inference in blocks 312 and 314.

One or more machine learning models and/or neural networks can be trained to perform semantic segmentation and/or object detection for inputs such as resized image 405. In one illustrative example, the machine learning models and/or neural networks can be trained to perform semantic segmentation and/or object detection in order to identify visually important regions within resized image 405. Visually important regions can be subsequently processed using a higher level of precision during inference, while the remaining regions (or regions identified as not visually important) can be subsequently processed using a lower level of precision during inference. In some cases, the semantic segmentation and/or object detection output(s) can directly indicate a determination of visually important. For example, a neural network can be trained to generate one or more segmentation masks for image regions that are classified as 'visually important' and one or more segmentation masks for image regions that are classified as 'not visually important.' In some examples, a neural network can be trained to generate one or more object detection or object classification outputs that include 'visually important' and 'not visually important' classifications. In some cases, the semantic segmentation and/or object detection output(s) can include discrete classifications of different object types (e.g., human, face, clothes, background, tree, etc.) that are subsequently analyzed in order to generate a determination of visual importance or non-visual importance.

For example, at block 310 the process 300 can include determining a precision level for one or more of the patches generated for the input image (e.g., the patches generated in block 304). For example, patches determined to include one or more areas of visual importance can be associated with or assigned a relatively high level of precision for inference (e.g., FP32, FP16, INT32, INT16). Patches determined not to include one or more areas of visual importance can be associated with or assigned a relatively low level of precision for inference (e.g., INT8, INT4). In some examples, an active determination of a level of precision for inference can be generated for each one of the patches. In some examples, a relatively high level of precision can be determined for patches that include one or more areas of visual importance and a default or pre-determined precision level can be utilized during inference for the remaining patches (e.g., where the default or pre-determined precision level is relatively lower than the precision level used during inference for the patches that include areas of visual importance).

In one illustrative example, the semantic segmentation and/or object detection output(s) (e.g., generated for the downscaled version 405 of the input image) can be mapped to the full-size input image and used to determine a precision level for one or more of the plurality of patches generated for the input image. In some cases, where the resized image 405 has the same aspect ratio as the input image, the semantic segmentation and/or object detection output(s) can be upscaled, resized, interpolated, etc., to match the input resolution of the input image. The upscaled semantic segmentation and/or object detection output(s) can then be overlaid with the input image and used to determine a precision level for the plurality of patches generated for the input image. In some examples, the semantic segmentation and/or object detection output(s) can have the same size, dimensions, or resolution as the resized image 405, and can be divided into the same number of patches as the input image, using the same patch division logic. A precision level can be determined for each patch of the semantic segmentation and/or object detection output(s), and the determined precision level can be used during inference for the corresponding full-sized patch of the input image.

In some examples, a relatively high level of precision can be determined for an image patch that includes at least a portion of one of the regions of visual interest (e.g., the regions of visual interest determined by the semantic segmentation or object detection of block 308). For example, a high level of precision can be determined and used during inference for each of the 16 image patches depicted in FIG. 4A, other than image patch 464. As illustrated, image patch 464 does not contain at least a portion of a segmentation mask/detected object associated with the human classification 420 and does not contain at least a portion of a segmentation mask/detected object associated with the drink classification 430. Based at least in part on image patch 464 not including a segmentation mask or detected object, image patch 464 can be identified as background and a lower level of precision can be used.

In some examples, a precision level can be determined based on the percentage or number of pixels within a given image patch that correspond to an area of visual importance (e.g., the percentage or number of pixels within an image patch that are included in a segmentation mask or detected object). For example, a relatively high level of precision can be used during inference for image patches with 50% or more pixels included in a segmentation mask or detected object and a relatively low level of precision can be used for the remainder (e.g., for image patches with less than 50% pixels included in a segmentation mask or detected object). As illustrated in FIG. 4A, when a 50% threshold is utilized, a high precision level can be used during inference for each of the 16 image patches other than patches 462, 464, 466, and 474 (e.g., and a lower precision level can be used during inference for the patches 462, 464, 466 and 474, each of which fall below the 50% threshold of pixels included in a segmentation mask or detected object).

In some examples, a precision level can be determined based on maximum and/or minimum quantities of patches that are to be assigned to a given precision level. For example, precision levels can be determined such that no more than half of the plurality of patches generated for the input image are assigned a high precision level for inference. In the example above in which 16 patches are generated for the input image, precision levels can be determined such that no more than eight patches are assigned a high precision level (e.g., at least eight patches are assigned a low precision level). For example, precision levels can be determined by identifying the eight image patches with the greatest number of pixels included in a segmentation mask or detected object.

In some cases, different classifications within the segmentation mask(s) and/or detected object(s) can be used to weight the plurality of image patches during the precision level determination. For example, a highest weighting can be assigned to a 'face' classification, an intermediate weighting can be assigned to a 'clothing' or 'body' classification, and a low weighting can be assigned to a 'drink' classification. In some cases, a zero weighting or a lowest weighting can be assigned to a background classification (or regions of the input image that are not included in a segmentation mask or detected object). For example, image patch 474 may not be assigned a high precision level when evaluating the image patches based on the percentage of pixels included in a segmentation mask or detected object, but can be assigned a high precision level when evaluating the image patches based on weighted classifications (e.g., because image patch 474 is below a 50% threshold of pixels included in a segmentation mask or detected object, but does include pixels belonging to the 'face' classification with the highest weighting).

In some examples, two or more precision levels can be used during inference for the individual patches generated for the input image. For example, the discussion above makes reference to a scenario in which a given image patch is assigned a relatively high precision level (e.g., FP32, FP16, INT32, INT16) or a relatively low precision level (e.g., INT8, INT4). In some cases, a given image patch can be assigned a high precision level (e.g., FP32, FP16, INT32), an intermediate precision level (e.g., INT16, INT8), or a low precision level (e.g., INT4). For example, image patches with pixels belonging to a 'face' classification or with greater than 75% pixels belonging to a segmentation mask/detected object can be assigned a high precision level; image patches with pixels belonging to a 'human' or 'body' classification, or with greater than 50% pixels belonging to a segmentation mask/detected object, can be assigned an intermediate precision level; and image patches identified as background or not meeting the conditions above can be assigned a low precision level.

At block 312, the process 300 can include performing low precision model inference (e.g., for image patches given a low precision level at block 310). At block 314, the process 300 can include performing high precision model inference (e.g., for image patches given a high precision level at block 310). In examples in which more than two precision levels are determined for or assigned (e.g., at block 310) to various ones of the plurality of image patches generated for the input image, the process 300 can include performing inference using each respective precision level of the more than two precision levels utilized at block 310.

In some examples, low precision model inference (e.g., block 312) and high precision model inference (e.g., block 314) can be performed using the same image processing (e.g., image2image) machine learning network. For example, the image processing machine learning network can include a first set of quantized activation function and weight values associated with the high precision level and can include a second set of quantized activation function and weight values associated with the low precision level. In some aspects, the image processing machine learning network can include, access, or otherwise obtain activation function and weight values quantized to each precision level that is utilized at block 310. In some examples, precision conversion can be performed to convert from a higher precision level (e.g., FP32, FP16, INT32, INT16) to a lower precision level (e.g., INT8, INT4). In some cases, a first image processing (e.g., image2image) machine learning network can be utilized, with activation functions and weights quantized based on the high precision level associated with block 314. A second image processing machine learning network can be provided with activation functions and weights quantized based on the low precision level associated with block 312.

In some examples, the precision level used to perform inference for a given image patch may be higher than a precision level associated with the pixels or image data of the patch. For example, image data captured in a Red-Green-Blue (RGB) color space can be represented in an INT8 number format. Image patches that include RGB INT8 data can be converted to a higher precision INT16, INT32, FP16, FP32, etc., number format prior to performing high precision model inference at block 314 (e.g., corresponding to the precision level associated with the high precision model inference). Similarly, image patches that include RGB INT8 data can be converted to a lower precision INT4 number format prior to performing low precision model inference at block 312 (e.g., when low precision model inference is associated with INT4 precision).

At block 316 the process 300 can include combining the mixed-precision image patches (e.g., from the low precision model inference at block 312 and the high precision model inference at block 314) into a single, processed output image. The processed output image can have the same resolution, size, dimensions, etc., as the input image. In some cases, the processed output image can be generated based on tiling or stitching the respective mixed-precision image patches together, where each respective mixed-precision image patch is associated with a same position in the input image and the output image. In some examples, the processed output image can be generated using an additional machine learning network that combines the mixed-precision image patches (e.g., to refine or remove artifacts at the borders between adjacent mixed-precision image patches, etc.).

In some examples, the systems and techniques described herein can include a segmentation model based on DeepLabV3 (e.g., a deep CNN that implements atrous convolution in cascade or in parallel to capture multi-scale context by adopting multiple atrous rates). For example, the semantic segmentation described above with respect to block 308 can be performed using one or more segmentation models based on DeepLabV3. In some cases, one or more image processing (e.g., image2image) machine learning models can be based on Unet (e.g., a fully convolutional neural network implementing a U-shaped encoder-decoder network architecture). For example, one or more (or both) of the low precision model inference associated with block 312 and the high precision model inference associated with block 314 can be performed using an image2image model based on Unet.

In some examples, the precision level used to perform inference using an image processing (e.g., image2image) machine learning model can include a first precision level component associated with activation functions of the model and a second precision level component associated with weights of the model. For example, a high precision level can utilize a 16-bit fixed point (e.g., INT16) number format for activations (e.g., internal representations of data in the model) and an 8-bit fixed-point (e.g., INT8) number format for weights. The high inference precision level can be implemented based on quantizing the activation functions of the image processing machine learning model to the high inference precision level. For example, a quantized tanh or sigmoid activation function can be implemented using a lookup table, where the returned or output values of the lookup table use the corresponding precision level associated with the quantization (e.g., an FP16 quantized activation function can correspond to a lookup table of 16-bit floating point values, an INT8 quantized activation function can correspond to a lookup table of 8-bit fixed point values, etc.). In some examples, a low precision level can utilize INT8 activations and INT4 weights, and/or a low precision level could utilize INT4 activations and INT4 weights; etc.

Figure 5:
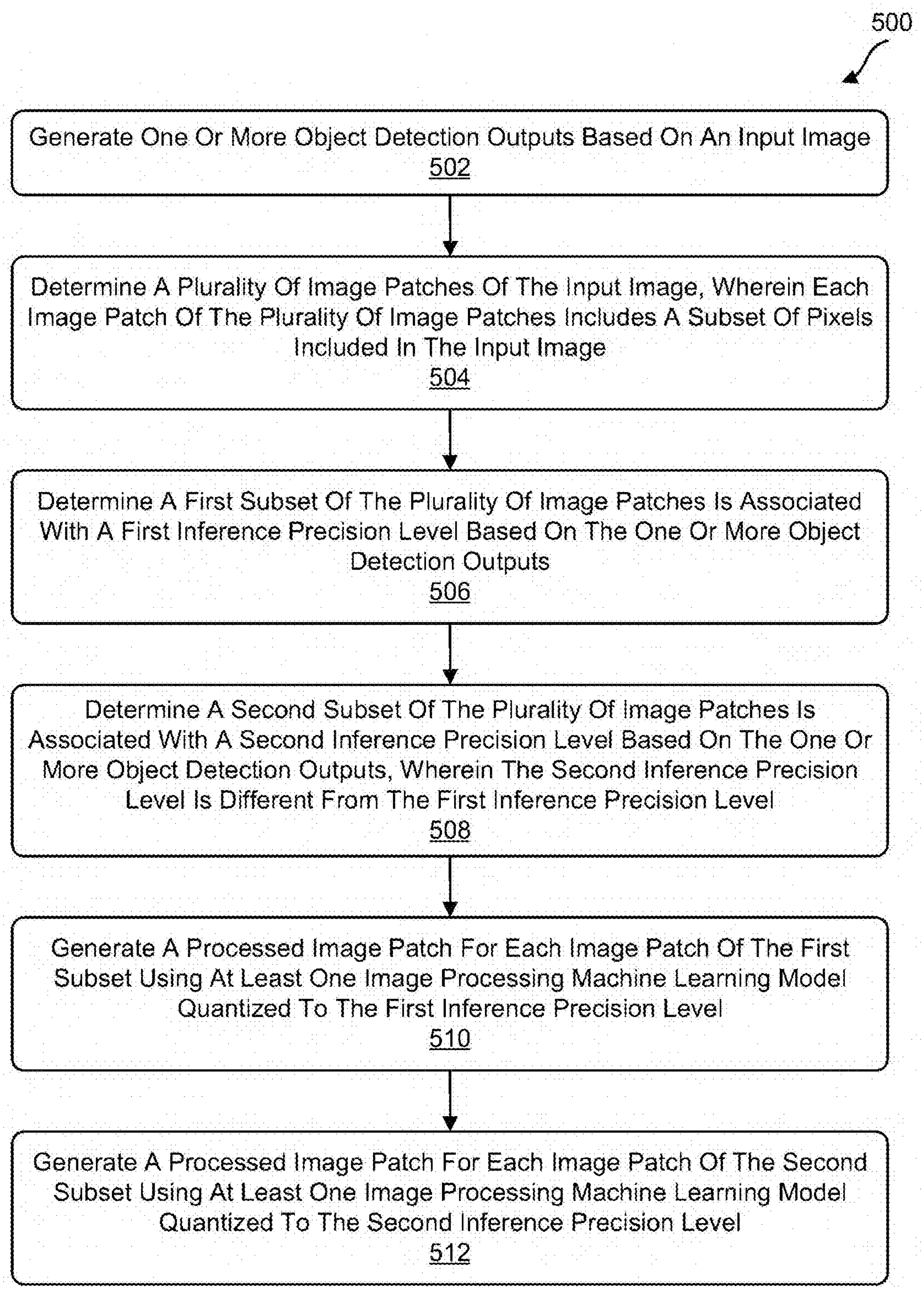
FIG. 5 is a flow diagram illustrating an example of a process for processing image and/or video data, in accordance with some examples.

FIG. 5 is a flowchart illustrating an example of a process 500 for processing image data. At block 502, the process 500 includes generating one or more object detection outputs based on an input image. For example, the one or more object detection outputs can include a semantic segmentation output and/or an object detection output. In some examples, the one or more object detection outputs can be generated based on a resized or downscaled version of the input image, wherein the resized image has smaller dimensions (e.g., in pixels) than the input image. For example, the input image can be a frame of 1080p video, a frame of 4K video, a frame of 8K video, a still image captured with a resolution given in megapixels (e.g., millions of pixels included in the still image), etc. In some cases, the resized image can have a resolution of 512×512 pixels or 384×384 pixels.

In some examples, a semantic segmentation neural network, an object detection neural network, and/or a trained machine learning network can be used to generate the one or more object detection outputs using the resized image. The object detection outputs can include one or more segmentation masks, classifications, labels, and/or detected objects associated with one or more portions of the resized image (e.g., associated with a subset of pixels of the resized image). For example, the object detection outputs can include one or more segmentation masks or detected objects associated with classifications such as human, face, skin, body, clothes, sky, tree, drink, background, etc.

At block 504, the process 500 includes determining a plurality of image patches of the input image, wherein each image patch of the plurality of image patches includes a subset of pixels included in the input image. For example, the plurality of image patches can include the 16 image patches 462-498 determined for the example input image 400 illustrated in FIG. 4A. In some examples, the plurality of image patches can be non-overlapping. In some cases, the plurality of image patches can have a same size, shape, pixel dimensions, number of pixels, etc. In some examples, the number of image patches determined for an input image can be based at least in part on an input resolution associated with the input image, with a greater number of image patches generated for input images with a larger resolution. In some cases, a number of image patches generated for an input image and/or a size of each image patch generated for an image patch can be pre-determined. In some examples, a number of image patches generated for an input image and/or a size of each image patch generated for an image patch can be determined based on the size or resolution of the input image.

At block 506, the process 500 includes determining a first subset of the plurality of image patches is associated with a first inference precision level, based on the one or more object detection outputs. For example, the first subset of image patches can be classified or determined as being associated with a high inference precision level. The high inference precision level can be a numeric precision level used to quantize, store or otherwise represent the numerical values associated with the activations and/or weights of an image processing (e.g., image2image) machine learning network. In some examples, a relatively high inference precision level can be associated with, but is not limited to, activations and/or weights of a machine learning network that are represented in a 32-bit floating-point (FP32), 16-bit floating-point (FP16), 32-bit fixed-point (INT32), or 16-bit fixed-point (INT16) number format (e.g., numeric precision). In some cases, the classification of the first subset of image patches can include assigning the first subset of image patches a first (e.g., high or relatively high) inference precision level.

At block 508, the process 500 includes determining a second subset of the plurality of image patches is associated with a second inference precision level based on the one or more object detection outputs, wherein the second inference precision level is different from the first inference precision level. For instance, the second subset of image patches can be classified or determined as being associated with a low inference precision level. The low inference precision level can be a numeric precision level used to quantized, store, or otherwise represent numerical values associated with the activations and/or weights of an image processing (e.g., image2image) machine learning network. In some examples, the same machine learning network can be quantized with the first inference precision level and used to process the first subset of the plurality of image patches, and can be quantized with the second inference precision level and used to process the second subset of the plurality of image patches. In some examples, a numeric precision associated with the first inference precision level is greater than a numeric precision associated with the second inference precision level. In some examples, the classification of the first subset of image patches can be performed in combination with classifying a second subset of image patches with a second (e.g., low or relatively low) inference precision level (e.g., lower than the first inference precision level). In some examples, each image patch of the plurality of image patches generated for the input image can be analyzed or classified in order to determine or otherwise assign a corresponding or respective inference precision level to each image patch.

For example, each image patch of the plurality of image patches can be analyzed or classified based on the one or more object detection outputs (e.g., semantic segmentation masks, detected objects, classifications, labels, etc.) described above with respect to block 502. In some cases, the image patches can be classified into a first (e.g., high) inference precision level class or a second (e.g., low) inference precision level class based at least in part on the image patch including one or more pixels that are included in an object detection output (e.g., one or more pixels that are included in a segmentation mask or detected object).

In some examples, analyzing or classifying the plurality of image patches into a determined inference precision level can include mapping the object detection outputs generated for the resized image (e.g., segmentation masks or detected objects) onto the plurality of image patches of the full-size (e.g., original resolution) input image. In some cases, the object detection outputs can be upscaled, interpolated, projected, etc., in order to convert the object detection outputs from the downscaled resolution of the resized image into the original resolution of the input image. Based at least in part on the mapping between the object detection outputs and the plurality of image patches of the input images, each image patch can be analyzed or classified based on factors such as visual interest or visual importance. Image patches with a greater visual interest or visual importance can be image patches that exceed a threshold percentage of pixels that are included in a segmentation mask or detected object. For example, image patches with 50% or more pixels included in a segmentation mask or detected object can be classified as visually important, and, based at least in part on the classification as visually important, these image patches can be assigned a relatively high inference precision level such as FP32, FP16, INT32, or INT16 numeric precision. Image patches with a lower visual importance or visual interest can be image patches that do not exceed the threshold percentage of pixels and/or that do not include pixels belonging to a classification with a higher weighting (e.g., classifications such as 'face' can be assigned a higher weighting than classifications such as 'foot' or 'shoes').

At block 510, the process 500 includes generating a processed image patch for each image patch of the first subset using at least one image processing machine learning model quantized to the first inference precision level. For example, the at least one image processing machine learning model can be quantized to a high inference precision level. The high inference precision level can include an FP16 number format (e.g., FP16 numeric precision), an INT32 number format (e.g., INT32 numeric precision), and/or an INT16 number format (e.g., INT16 numeric precision). An image processing (e.g., image2image) machine learning model may be trained with FP32 training data and may be associated with FP32 activations and weight values that were learned during training. An image processing machine learning model associated with a higher precision level than is determined for a given image patch can be quantized to the appropriate precision level prior to performing inference for the given image patch (e.g., an FP32 model can be quantized to FP16 for an image patch assigned FP16 inference precision and can be quantized to INT16 for an image patch assigned INT16 inference precision, etc.).

At block 512, the process 500 includes generating a processed image patch for each image patch of the second subset using at least one image processing machine learning model quantized to the second inference precision level. In some examples, the same machine learning model can be used to generate the processed image patches for the first subset and for the second subset. For instance, the machine learning model can be quantized to the first inference precision level and used to generate the processed image patches for the first subset, and can be quantized to the second inference precision level and used to generate the processed image patches for the second subset.

In some cases, the processed image patches generated by the image processing (e.g., image2image) machine learning network quantized to the first inference precision level can be combined with the processed image patches generated by the image processing (e.g., image2image) machine learning network quantized to the second inference precision level. The processed image patches can be combined to generate a single, processed output image with relatively high precision inference (e.g., higher accuracy and/or fewer visual artifacts) utilized for regions of the image determined to be visually important and with a relatively low precision inference (e.g., lower accuracy and/or increased presence of visual artifacts) utilized for background regions and other regions of the image that were determined to be of lesser visual importance.

In some examples, the processes described herein (e.g., process 300, process 500, and/or any other process described herein) may be performed by a computing device, apparatus, or system. In one example, the processes 300 and/or 500 can be performed by a computing device or system having the computing device architecture 600 of FIG. 6. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the processes 300 and/or 500 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 300 and/or 500 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 300 and/or 500 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
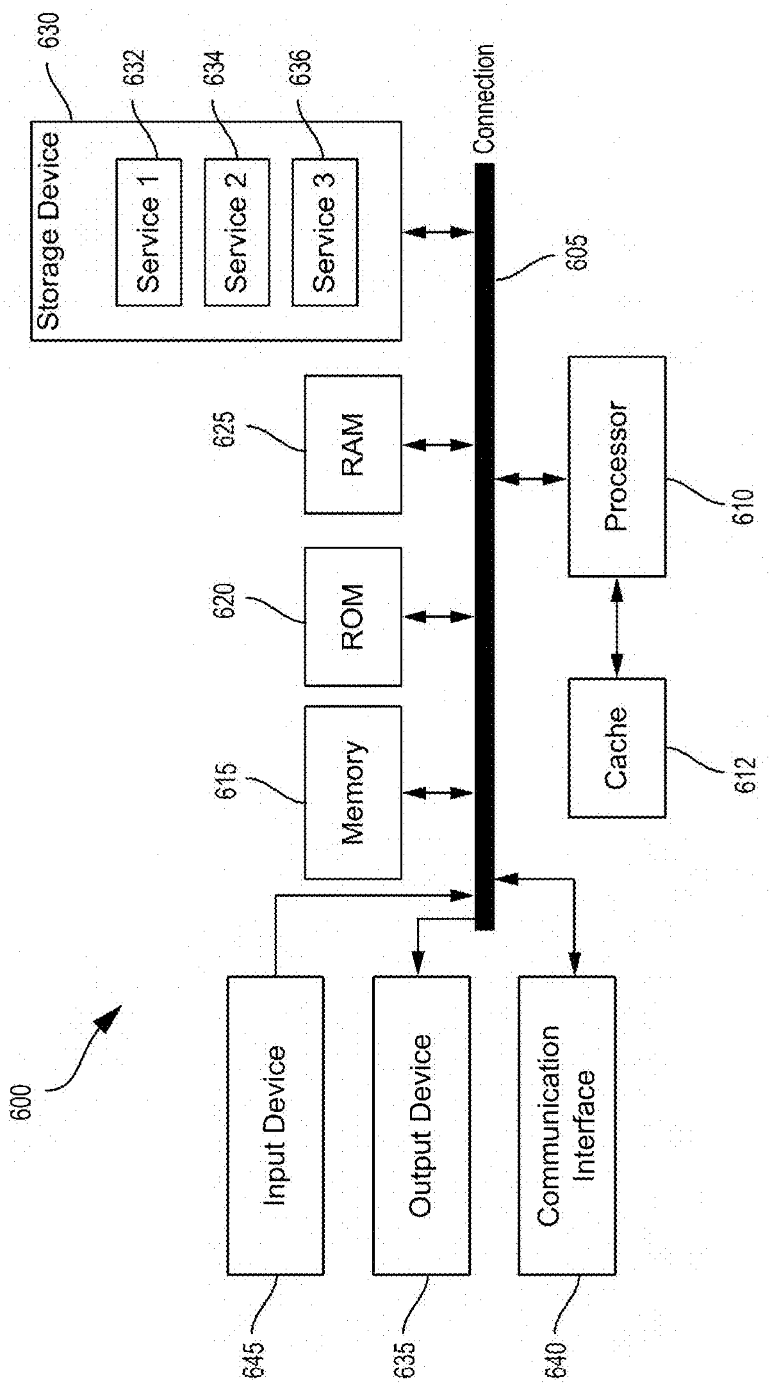
FIG. 6 is a block diagram illustrating an example of a computing system for implementing certain aspects described herein.

FIG. 6 illustrates an example computing device architecture 600 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 600 are shown in electrical communication with each other using connection 605, such as a bus. The example computing device architecture 600 includes a processing unit (CPU or processor) 610 and computing device connection 605 that couples various computing device components including computing device memory 615, such as read only memory (ROM) 620 and random-access memory (RAM) 625, to processor 610.

Computing device architecture 600 can include a cache of high-speed memory connected directly with, in close proximity to, or integrated as part of processor 610. Computing device architecture 600 can copy data from memory 615 and/or the storage device 630 to cache 612 for quick access by processor 610. In this way, the cache can provide a performance boost that avoids processor 610 delays while waiting for data. These and other engines can control or be configured to control processor 610 to perform various actions. Other computing device memory 615 may be available for use as well. Memory 615 can include multiple different types of memory with different performance characteristics. Processor 610 can include any general-purpose processor and a hardware or software service, such as service 1 632, service 2 634, and service 3 636 stored in storage device 630, configured to control processor 610 as well as a special-purpose processor where software instructions are incorporated into the processor design. Processor 610 may be a self-contained system, containing multiple cores or processors, a bus, memory controller, cache, etc. A multi-core processor may be symmetric or asymmetric.

To enable user interaction with the computing device architecture 600, input device 645 can represent any number of input mechanisms, such as a microphone for speech, a touch-sensitive screen for gesture or graphical input, keyboard, mouse, motion input, speech and so forth. Output device 635 can also be one or more of a number of output mechanisms known to those of skill in the art, such as a display, projector, television, speaker device, etc. In some instances, multimodal computing devices can enable a user to provide multiple types of input to communicate with computing device architecture 600. Communication interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. Storage device 630 can include services 632, 634, 636 for controlling processor 610. Other hardware or software modules or engines are contemplated. Storage device 630 can be connected to the computing device connection 605. In one aspect, a hardware module that performs a particular function can include the software component stored in a computer-readable medium in connection with the necessary hardware components, such as processor 610, connection 605, output device 635, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("$<$") and greater than ("$>$") symbols or terminology used herein can be replaced with less than or equal to ("$\leq$") and greater than or equal to ("$\geq$") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic array's (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing image data, comprising: at least one memory; and at least one processor coupled to the at least one memory, the at least one processor configured to: generate one or more object detection outputs based on an input image; determine a plurality of image patches of the input image, wherein each image patch of the plurality of image patches includes a subset of pixels included in the input image; determine a first subset of the plurality of image patches is associated with a first inference precision level based on the one or more object detection outputs; determine a second subset of the plurality of image patches is associated with a second inference precision level based on the one or more object detection outputs, wherein the second inference precision level is different from the first inference precision level; generate a processed image patch for each image patch of the first subset using at least one image processing machine learning model quantized to the first inference precision level; and generate a processed image patch for each image patch of the second subset using at least one image processing machine learning model quantized to the second inference precision level.

Aspect 2. The apparatus of Aspect 1, wherein a numeric precision associated with the first inference precision level is greater than a numeric precision associated with the second inference precision level.

Aspect 3. The apparatus of any of Aspects 1 to 2, wherein: to generate the processed image patch for each image patch of the first subset, the at least one processor is configured to use an image processing model parameterized with a first set of quantized activation function and weight values; and to generate the processed image patch for each image patch of the second subset, the at least one processor is configured to use the image processing model parameterized with a second set of quantized activation function and weight values.

Aspect 4. The apparatus of Aspect 3, wherein: the first set of quantized activation function and weight values is quantized using the first inference precision level; and the second set of quantized activation function and weight values is quantized using the second inference precision level.

Aspect 5. The apparatus of any of Aspects 1 to 4, wherein: the at least one image processing machine learning model quantized to the first inference precision level is based on quantizing a trained image processing machine learning model; the at least one image processing machine learning model quantized to the second inference precision level is based on quantizing the trained image processing machine learning model; and the trained image processing machine learning model includes one or more weight values stored using a 32-bit floating-point (FP32) numeric precision.

Aspect 6. The apparatus of any of Aspects 1 to 5, wherein: the at least one image processing machine learning model quantized to the second inference precision level is associated with one or more weight values stored using an 8-bit fixed-point (INT8) or a 4-bit fixed-point (INT4) numeric precision.

Aspect 7. The apparatus of any of Aspects 1 to 6, wherein: the at least one image processing machine learning model quantized to the first inference precision level is associated with one or more weight values stored using a 32-bit floating-point (FP32), a 16-bit floating-point (FP16), or a 16-bit fixed-point (INT16) numeric precision.

Aspect 8. The apparatus of any of Aspects 1 to 7, wherein, to generate the one or more object detection outputs, the at least one processor is configured to: generate a resized image based on the input image, wherein a quantity of pixels of the resized image is less than a quantity of pixels of the input image; and determine one or more object classifications based on the resized image, wherein each object classification of the one or more object classifications includes a respective classification and a respective set of pixels of the resized image associated with the respective classification.

Aspect 9. The apparatus of Aspect 8, wherein, to determine the one or more object classifications, the at least one processor is configured to: determine one or more features for the resized image; and generate one or more segmentation masks for the resized image based on the one or more features, wherein each segmentation mask of the one or more segmentation masks corresponds to a particular object classification of the one or more object classifications.

Aspect 10. The apparatus of Aspect 9, wherein the at least one processor is configured to generate the one or more segmentation masks using a semantic segmentation neural network.

Aspect 11. The apparatus of any of Aspects 9 to 10, wherein the one or more segmentation masks includes: a first segmentation mask corresponding to pixels classified as visually important; and a second segmentation mask corresponding to pixels not classified as visually important.

Aspect 12. The apparatus of any of Aspects 1 to 11, wherein the at least one processor is configured to generate the one or more object detection outputs and determine the plurality of image patches in parallel.

Aspect 13. The apparatus of Aspect 12, wherein the at least one processor is configured to: determine the plurality of image patches based on dividing the input image into a plurality of respective subsets of pixels included in the input image; and generate the one or more object detection outputs based on downscaling the input image and processing a corresponding downscaled input image.

Aspect 14. The apparatus of Aspect 13, wherein a resolution of the downscaled input image is less than a resolution of the input image.

Aspect 15. The apparatus of any of Aspects 1 to 14, wherein the at least one processor is configured to classify the first subset of the plurality of image patches with the first inference precision level based on a visual importance determined for each image patch of the first subset.

Aspect 16. The apparatus of any of Aspects 1 to 15, wherein the at least one image processing machine learning model is a single machine learning model.

Aspect 17. A method for processing image data, comprising: generating one or more object detection outputs based on an input image; determining a plurality of image patches of the input image, wherein each image patch of the plurality of image patches includes a subset of pixels included in the input image; determining a first subset of the plurality of image patches is associated with a first inference precision level based on the one or more object detection outputs; determining a second subset of the plurality of image patches is associated with a second inference precision level based on the one or more object detection outputs, wherein the second inference precision level is different from the first inference precision level; generating a processed image patch for each image patch of the first subset using at least one image processing machine learning model quantized to the first inference precision level; and generating a processed image patch for each image patch of the second subset using at least one image processing machine learning model quantized to the second inference precision level.

Aspect 18. The method of Aspect 17, wherein a numeric precision associated with the first inference precision level is greater than a numeric precision associated with the second inference precision level.

Aspect 19. The method of any of Aspects 17 to 18, wherein: the processed image patch for each image patch of the first subset is generated using an image processing model parameterized with a first set of quantized activation function and weight values; and the processed image patch for each image patch of the second subset is generated using the image processing model parameterized with a second set of quantized activation function and weight values.

Aspect 20. The method of Aspect 19, wherein: the first set of quantized activation function and weight values is quantized using the first inference precision level; and the second set of quantized activation function and weight values is quantized using the second inference precision level.

Aspect 21. The method of any of Aspects 17 to 20, wherein: the at least one image processing machine learning model quantized to the first inference precision level is based on quantizing a trained image processing machine learning model; the at least one image processing machine learning model quantized to the second inference precision level is based on quantizing the trained image processing machine learning model; and the trained image processing machine learning model includes one or more weight values stored using a 32-bit floating-point (FP32) numeric precision.

Aspect 22. The method of any of Aspects 17 to 21, wherein: the at least one image processing machine learning model quantized to the second inference precision level is associated with one or more weight values stored using an 8-bit fixed-point (INT8) or a 4-bit fixed-point (INT4) numeric precision.

Aspect 23. The method of any of Aspects 17 to 22, wherein: the at least one image processing machine learning model quantized to the first inference precision level is associated with one or more weight values stored using a 32-bit floating-point (FP32), a 16-bit floating-point (FP16), or a 16-bit fixed-point (INT16) numeric precision.

Aspect 24. The method of any of Aspects 17 to 23, wherein generating the one or more object detection outputs includes: generating a resized image based on the input image, wherein a quantity of pixels of the resized image is less than a quantity of pixels of the input image; and determining one or more object classifications based on the resized image, wherein each object classification of the one or more object classifications includes a respective classification and a respective set of pixels of the resized image associated with the respective classification.

Aspect 25. The method of Aspect 24, wherein determining the one or more object classifications includes: determining one or more features for the resized image; and generating one or more segmentation masks for the resized image based on the one or more features, wherein each segmentation mask of the one or more segmentation masks corresponds to a particular object classification of the one or more object classifications.

Aspect 26. The method of Aspect 25, further comprising generating the one or more segmentation masks using a semantic segmentation neural network.

Aspect 27. The method of any of Aspects 25 to 26, wherein the one or more segmentation masks includes: a first segmentation mask corresponding to pixels classified as visually important; and a second segmentation mask corresponding to pixels not classified as visually important.

Aspect 28. The method of any of Aspects 17 to 27, further comprising classifying the first subset of the plurality of image patches with the first inference precision level based on a visual importance determined for each image patch of the first subset.

Aspect 29. The method of any of Aspects 17 to 28, wherein the at least one image processing machine learning model includes a single machine learning model.

Aspect 30. The method of any of Aspects 17 to 29, wherein the at least one image processing machine learning model includes at least a first machine learning model and a second machine learning model.

Aspect 31: A computer-readable medium storing instructions that, when executed by one or more processors, cause the one or more processors to perform operations according to any of Aspects 1 to 16.

Aspect 32: A computer-readable medium storing instructions that, when executed by one or more processors, cause the one or more processors to perform operations according to any of Aspects 17 to 30.

Aspect 33: An apparatus for processing image data, comprising one or more means for performing operations according to any of Aspects 1 to 16.

Aspect 34: An apparatus for processing image data, comprising one or more means for performing operations according to any of Aspects 17 to 30.

What is claimed is:

1. An apparatus for processing image data, comprising:
at least one memory; and
at least one processor coupled to the at least one memory, the at least one processor configured to:
generate one or more object detection outputs based on an input image;
determine a plurality of image patches of the input image, wherein each image patch of the plurality of image patches includes a subset of pixels included in the input image;
determine a first subset of the plurality of image patches is associated with a first inference precision level based on the one or more object detection outputs;
determine a second subset of the plurality of image patches is associated with a second inference precision level based on the one or more object detection outputs, wherein the second inference precision level is different from the first inference precision level;
generate a processed image patch for each image patch of the first subset using at least one image processing machine learning model quantized to the first inference precision level; and
generate a processed image patch for each image patch of the second subset using at least one image processing machine learning model quantized to the second inference precision level.

2. The apparatus of claim 1, wherein a numeric precision associated with the first inference precision level is greater than a numeric precision associated with the second inference precision level.

3. The apparatus of claim 1, wherein:
to generate the processed image patch for each image patch of the first subset, the at least one processor is configured to use an image processing model parameterized with a first set of quantized activation function and weight values; and
to generate the processed image patch for each image patch of the second subset, the at least one processor is configured to use the image processing model parameterized with a second set of quantized activation function and weight values.

4. The apparatus of claim 3, wherein:
the first set of quantized activation function and weight values is quantized using the first inference precision level; and
the second set of quantized activation function and weight values is quantized using the second inference precision level.

5. The apparatus of claim 1, wherein:
the at least one image processing machine learning model quantized to the first inference precision level is based on quantizing a trained image processing machine learning model;
the at least one image processing machine learning model quantized to the second inference precision level is based on quantizing the trained image processing machine learning model; and
the trained image processing machine learning model includes one or more weight values stored using a 32-bit floating-point (FP32) numeric precision.

6. The apparatus of claim 1, wherein:
the at least one image processing machine learning model quantized to the second inference precision level is associated with one or more weight values stored using an 8-bit fixed-point (INT8) or a 4-bit fixed-point (INT4) numeric precision.

7. The apparatus of claim 1, wherein:
the at least one image processing machine learning model quantized to the first inference precision level is associated with one or more weight values stored using a 32-bit floating-point (FP32), a 16-bit floating-point (FP16), or a 16-bit fixed-point (INT16) numeric precision.

8. The apparatus of claim 1, wherein, to generate the one or more object detection outputs, the at least one processor is configured to:
generate a resized image based on the input image, wherein a quantity of pixels of the resized image is less than a quantity of pixels of the input image; and
determine one or more object classifications based on the resized image, wherein each object classification of the one or more object classifications includes a respective classification and a respective set of pixels of the resized image associated with the respective classification.

9. The apparatus of claim 8, wherein, to determine the one or more object classifications, the at least one processor is configured to:
determine one or more features for the resized image; and
generate one or more segmentation masks for the resized image based on the one or more features, wherein each segmentation mask of the one or more segmentation masks corresponds to a particular object classification of the one or more object classifications.

10. The apparatus of claim 9, wherein the at least one processor is configured to generate the one or more segmentation masks using a semantic segmentation neural network.

11. The apparatus of claim 9, wherein the one or more segmentation masks includes:
a first segmentation mask corresponding to pixels classified as visually important; and
a second segmentation mask corresponding to pixels not classified as visually important.

12. The apparatus of claim 1, wherein the at least one processor is configured to generate the one or more object detection outputs and determine the plurality of image patches in parallel.

13. The apparatus of claim 12, wherein the at least one processor is configured to:
determine the plurality of image patches based on dividing the input image into a plurality of respective subsets of pixels included in the input image; and
generate the one or more object detection outputs based on downscaling the input image and processing a corresponding downscaled input image.

14. The apparatus of claim 13, wherein a resolution of the downscaled input image is less than a resolution of the input image.

15. The apparatus of claim 1, wherein the at least one processor is configured to classify the first subset of the plurality of image patches with the first inference precision level based on a visual importance determined for each image patch of the first subset.

16. The apparatus of claim 1, wherein the at least one image processing machine learning model is a single machine learning model.

17. A method for processing image data, comprising:
generating one or more object detection outputs based on an input image;
determining a plurality of image patches of the input image, wherein each image patch of the plurality of image patches includes a subset of pixels included in the input image;
determining a first subset of the plurality of image patches is associated with a first inference precision level based on the one or more object detection outputs;
determining a second subset of the plurality of image patches is associated with a second inference precision level based on the one or more object detection outputs, wherein the second inference precision level is different from the first inference precision level;
generating a processed image patch for each image patch of the first subset using at least one image processing machine learning model quantized to the first inference precision level; and
generating a processed image patch for each image patch of the second subset using at least one image processing machine learning model quantized to the second inference precision level.

18. The method of claim 17, wherein a numeric precision associated with the first inference precision level is greater than a numeric precision associated with the second inference precision level.

19. The method of claim 17, wherein:
the processed image patch for each image patch of the first subset is generated using an image processing model parameterized with a first set of quantized activation function and weight values; and
the processed image patch for each image patch of the second subset is generated using the image processing model parameterized with a second set of quantized activation function and weight values.

20. The method of claim 19, wherein:
the first set of quantized activation function and weight values is quantized using the first inference precision level; and
the second set of quantized activation function and weight values is quantized using the second inference precision level.

21. The method of claim 17, wherein:
the at least one image processing machine learning model quantized to the first inference precision level is based on quantizing a trained image processing machine learning model;
the at least one image processing machine learning model quantized to the second inference precision level is based on quantizing the trained image processing machine learning model; and
the trained image processing machine learning model includes one or more weight values stored using a 32-bit floating-point (FP32) numeric precision.

22. The method of claim 17, wherein:
the at least one image processing machine learning model quantized to the second inference precision level is associated with one or more weight values stored using an 8-bit fixed-point (INT8) or a 4-bit fixed-point (INT4) numeric precision.

23. The method of claim 17, wherein:
the at least one image processing machine learning model quantized to the first inference precision level is associated with one or more weight values stored using a 32-bit floating-point (FP32), a 16-bit floating-point (FP16), or a 16-bit fixed-point (INT16) numeric precision.

24. The method of claim 17, wherein generating the one or more object detection outputs includes:
generating a resized image based on the input image, wherein a quantity of pixels of the resized image is less than a quantity of pixels of the input image; and
determining one or more object classifications based on the resized image, wherein each object classification of the one or more object classifications includes a respective classification and a respective set of pixels of the resized image associated with the respective classification.

25. The method of claim 24, wherein determining the one or more object classifications includes:
determining one or more features for the resized image; and
generating one or more segmentation masks for the resized image based on the one or more features, wherein each segmentation mask of the one or more segmentation masks corresponds to a particular object classification of the one or more object classifications.

26. The method of claim 25, further comprising generating the one or more segmentation masks using a semantic segmentation neural network.

27. The method of claim 25, wherein the one or more segmentation masks includes:
a first segmentation mask corresponding to pixels classified as visually important; and
a second segmentation mask corresponding to pixels not classified as visually important.

28. The method of claim 17, further comprising classifying the first subset of the plurality of image patches with the first inference precision level based on a visual importance determined for each image patch of the first subset.

29. The method of claim 17, wherein the at least one image processing machine learning model includes a single machine learning model.

30. The method of claim 17, wherein the at least one image processing machine learning model includes at least a first machine learning model and a second machine learning model.

* * * * *